March 15, 1966
F. W. LEHAN ETAL
3,240,108
OPTICAL ANALYZER
Filed Feb. 13, 1961
5 Sheets-Sheet 2
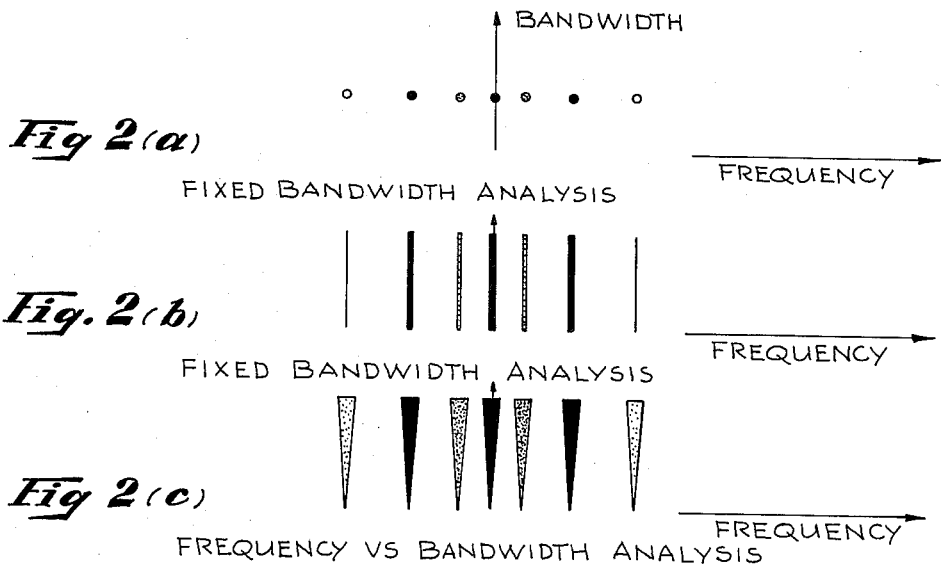
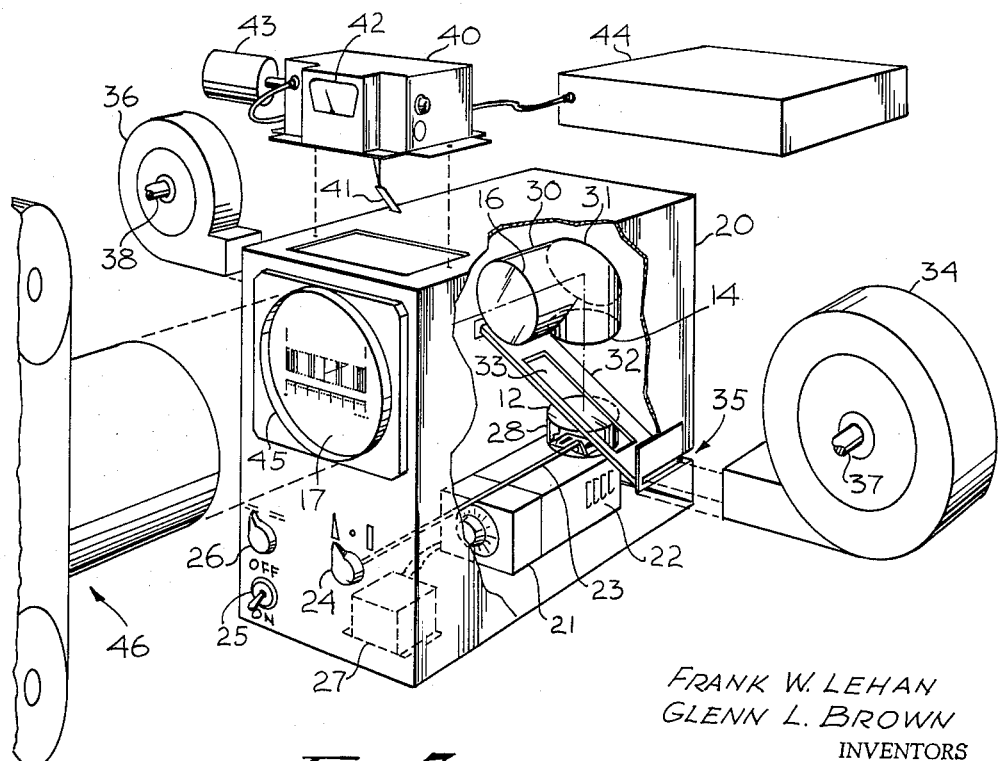
FRANK W. LEHAN
GLENN L. BROWN
INVENTORS
BY Allen E. Botney
ATTORNEY

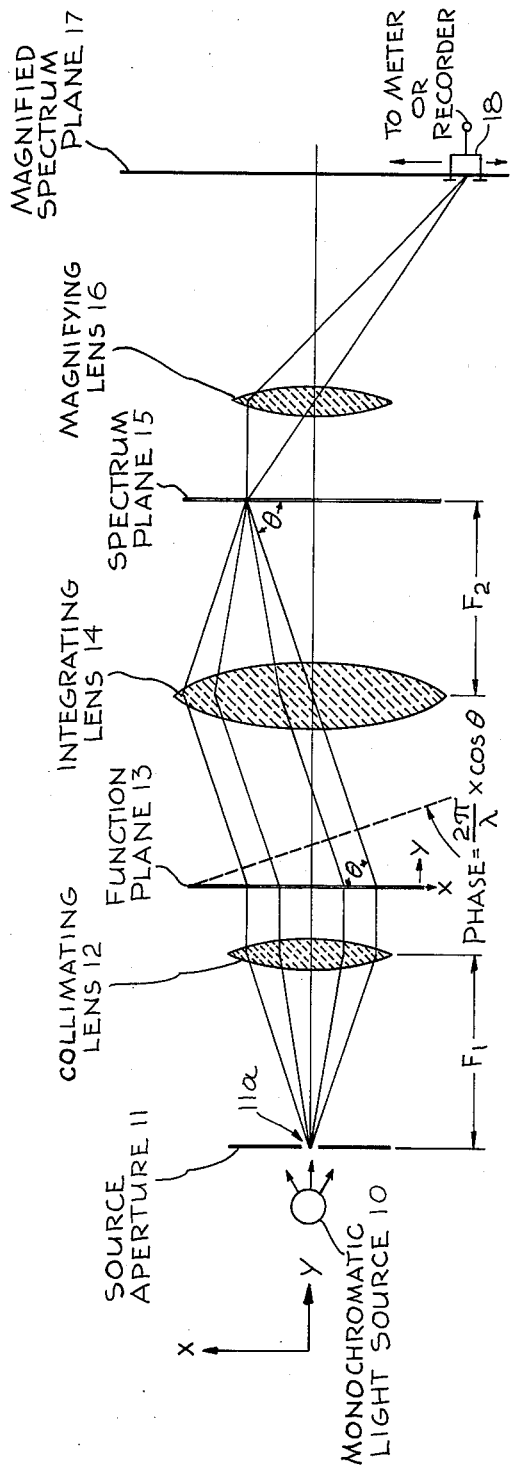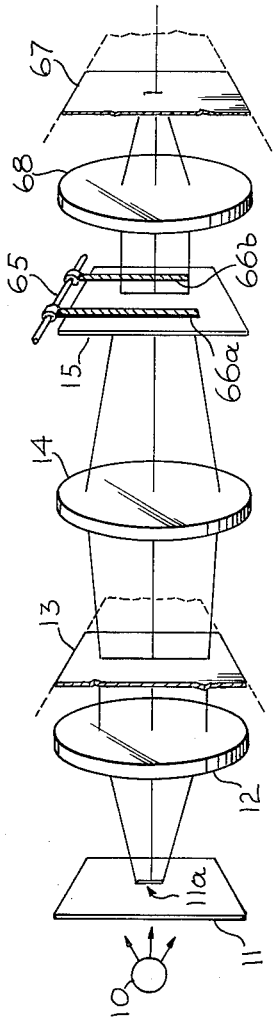

FRANK W. LEHAN
GLENN L. BROWN
INVENTORS

ATTORNEY

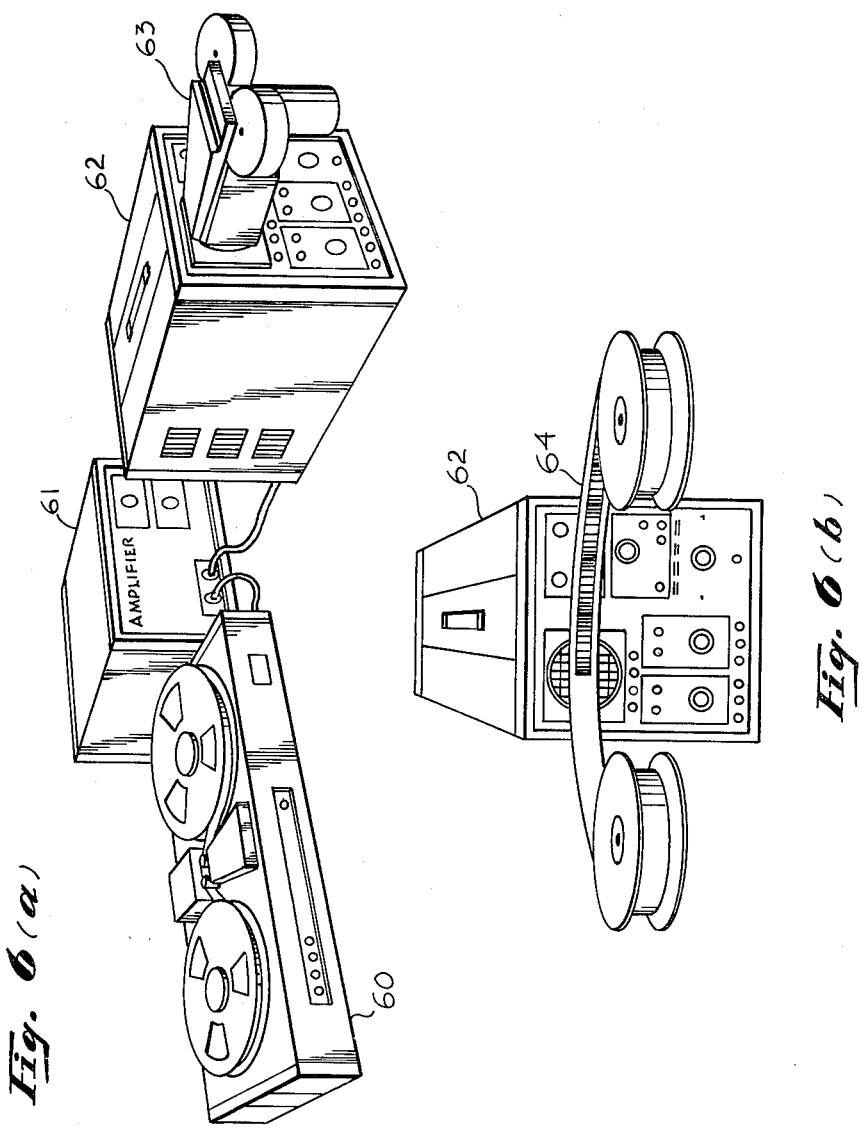

March 15, 1966  F. W. LEHAN ETAL  3,240,108
OPTICAL ANALYZER
Filed Feb. 13, 1961  5 Sheets-Sheet 5
Fig. 7(a)
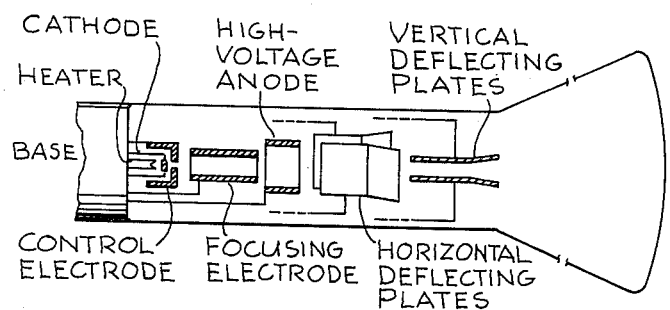
Fig. 7(b)
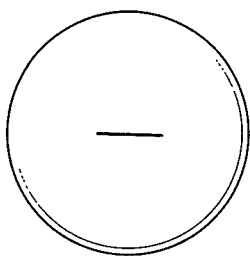
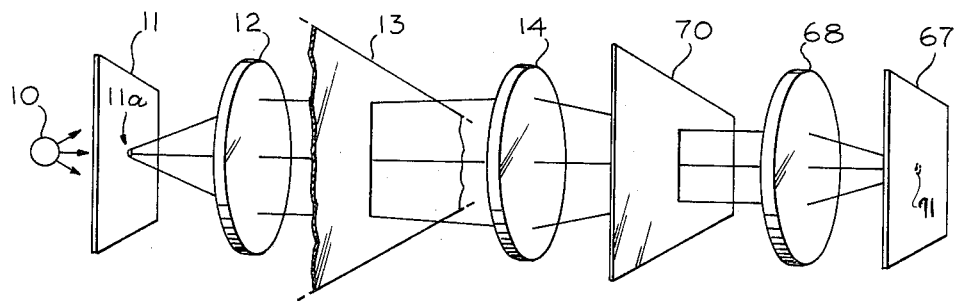
Fig. 9
FRANK W. LEHAN
GLENN L. BROWN
INVENTORS
BY *Allen E. Botney*
ATTORNEY

United States Patent Office 3,240,108
Patented Mar. 15, 1966

3,240,108
OPTICAL ANALYZER
Frank W. Lehan, Glendale, and Glenn L. Brown, Los Angeles, Calif., assignors to Space-General Corporation, Glendale, Calif., a corporation of California
Filed Feb. 13, 1961, Ser. No. 88,730
3 Claims. (Cl. 88—14)

The present invention relates in general to optical apparatus and more particularly relates to an optical spectrum analyzer.

There has been a long-felt need for apparatus capable of obtaining a rapid and accurate spectral analysis of any given data function such as, for example, the data function obtained by measuring and recording vibration phenomena at a point on an instrument placed in a vibration environment. Spectral analysis are at present most commonly performed by generating a voltage function which is the electrical analog of the data function and then using an array of electrical bandpass filters to obtain a plot of spectral amplitude versus frequency. Aside from their unsophisticated nature, apparatus of this type generally require hours of instrument operation and measurements by highly trained personnel.

With the aid of optical techniques, the present invention eliminates or in large measure reduces the deficiencies and limitations of electrical systems used in the prior art to provide spectrum analysis. More particularly, employing the diffraction and interference properties of monochromatic light waves, the present invention performs mathematical operations of an integral transform nature or, stated differently, it has the property of evaluating Fourier transform integrals and thus of performing a spectral analysis of an applied data signal. An optical spectrum analyzer having these properties offers the very great advantage of instantaneous spectrum analysis and the further benefit that it would be much less complex than that of an electrical filter counterpart. In addition, an optical analyzer according to the present invention would be much more versatile than an electrical spectrum analyzer in that three-dimensional presentations of frequency versus spectrum amplitude versus effective filter bandwidth could be obtained very simply without equipment complication. Moreover, the property of instantaneous spectrum presentation allows a data function to be run continuously through the system and the spectrum observed as a continuous function of time. In short, an optical spectrum analyzer arrangement as envisaged herein is considerably superior in its structural and operational features to its electrical counterpart in present use.

According to an embodiment of the invention, monochromatic light originating from a point source is passed through an aperture and then through a collimating lens following the aperture. The substantially parallel rays of light emerging from this lens then falls upon a data function transparency which, in accordance with a new and novel technique, is density modulated so that the light emerging from the transparency is amplitude modulated by the data function, that is to say, the amplitude of the emergent light is proportional to the amplitude of the recorded function at any particular point. Each point on the transparency may, therefore, be considered to be a Huygens source which radiates monochromatic lines whose amplitude is determined by the recorded function and the position of the point in question.

The rays of light are thereafter passed through an integrating lens at which time they are converged on an object or spectrum plane and, in accordance with aforesaid principles, the intensity of the light at any particular point in the spectrum plane can be found by adding the amplitude and phase of all the light rays originating from all of the points on the data function transparency. In other words, a diffraction pattern is formed in the spectrum plane with the intensity at any point in the pattern being proportional to the amplitude of the power spectral density of the data function for a particular frequency. Stated differently, there is a one-to-one correspondence between points in the spectrum plane and frequency components of the data function. Furthermore, the intensity of the light at a particular point in the spectrum plane is proportional to the amplitude of the power spectrum of the data function at the frequency to which the point corresponds. The amplitude of the power spectrum of the data function at any one frequency may be measured with a novel power meter device especially adapted for this purpose.

The optical spectrum analyzer of the present invention not only provides all the benefits and advantages heretofore mentioned but also includes features which make it possible to provide additional benefits that are not readily attained in the prior art. Thus, an analyzer according to the present invention may easily be adapted to filter out pre-selected frequency components from the diffraction pattern, which can then be converted back to the original data function minus the frequencies or frequency bands removed from the spectrum. In this way, a clear indication may be obtained of the over-all effect produced by one or more frequency components. Furthermore, three-dimensional presentations of frequency versus spectrum amplitude versus effective filter bandwidth can be simply obtained without undue equipment complications. In addition, the property of instantaneous spectrum presentation allows a data function to be run continuously through the system and the spectrum variations observed as a continuous function of time. Still other advantages and uses of the present invention are available. Thus, for example, the present invention may be embodied in such a form as to provide an optical matched filter, an embodiment of which will be described hereinafter.

It is, therefore, an object of the present invention to provide an apparatus that uses optical techniques to produce a frequency analysis of a particular data function.

It is an additional object of the present invention to provide optical apparatus capable of measuring the power contained in each frequency component of a data function.

It is a further object of the present invention to provide an optical analyzer that will produce a spectrum analysis of a data function instantaneously upon introduction of the data function into the optical analyzer.

It is another object of the present invention to provide an optical analyzer into which a data function can be fed continuously in order to produce a presentation of spectrum variation with time.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIG. 1 is a schematic presentation for illustrating the basic principles of the present invention;

FIG. 2 illustrates the types of spectral presentations that may be obtained with embodiments of the present invention;

FIG. 3 is a view, partly in cross-section, illustrating one arrangement for an embodiment of the present invention;

Figure 4:
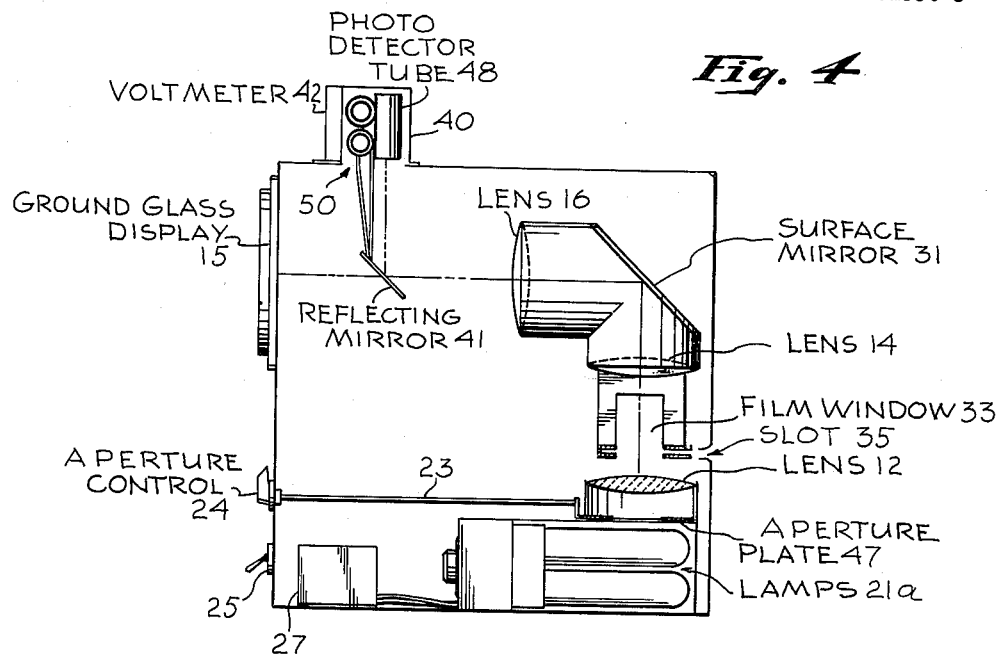
FIG. 4 is a side view, in cross-section, of the arrangement shown in FIG. 3.

FIGS. 6(a), 6(b), 7(a) and 7(b) are illustrations useful in explaining a new and novel technique for producing an intensity-modulated data function on a film transparency;

FIG. 8 is a schematic presentation illustrating the principles for reproducing the data function minus preselected frequency components; and FIG. 9 illustrates the basic features of an optical matched filter.

Referring now to the drawings, consideration is given first to the diagram of FIG. 1 wherein the basic aspects of the present invention are illustrated. As shown therein, an optical analyzer according to the present invention basically comprises a lamp or light source 10 capable of providing monochromatic light, such as a mercury vapor lamp having a filter associated with it. A member 11 having an aperture 11a through it through which the light from source 10 may pass, such as a rectangular slit, a pinhole or a triangular slit, is interposed between light source 10 and a collimating lens 12 whose function it is to produce substantially parallel rays of light from the divergent light emerging from aperture 11a. A transparency or function plane 13 upon which a data function is recorded for analysis, such as a strip of photographic film or a film slide, is placed between collimating lens 12 and an integrating lens 14, the data function transparency being positioned so that the light from lens 12 will pass through it to lens 14. The data function itself is recorded on the transparency by the process known as density modulation, which results in a trace of constant width where the density of the photographic image is proportional to the square of the amplitude of the data function. On the other side of lens 14, there is positioned an object or spectrum plane 15 upon which a diffraction pattern is projected by the light rays converged by lens 14. If it is deemed necessary to enlarge or magnify the above-said diffraction pattern, a magnifying lens 16 is used in conjunction with a second spectrum plane 17, the magnifying lens being suitably positioned between the two spectrum planes.

It will be recognized, of course, that spectrum plane 15 must necessarily be of a transparent nature if the diffraction pattern projected upon it is to be passed on for magnification. It is also desirable that second spectrum plane 17 either be transparent or have suitable openings therethrough so that one or more photo-detector devices positioned along the outside surface of this plane, such as photo-detector device 18, may receive the different components of the diffraction pattern. As is known, a photo-detector device produces an electrical signal whose strength corresponds to the intensity of the light received by it. The electrical signals thusly produced may then be applied to appropriate meter or recorder mechanisms, as indicated in the figure. Two arrangements of photo-detector devices 18 are possible, namely, either using as many photo-detector devices as there are light components or else using a single photo-detector device movably mounted on a track so that it can be used to scan the diffraction pattern. For sake of simplicity, a single photo-detector only is shown in the figure.

In operation, monochromatic light, originating from lamp 10, passes through aperture 11a and then through lens 12 following the aperture. Collimating lens 12 forms a substantially parallel beam of light which falls upon data function transparency 13, the light emerging from the transparency thereby being amplitude modulated by the data function. Stated differently, source aperture 11a is illuminated by light from monochromatic light source 10. The coherent light rays originating from a point in the aperture are made parallel by lens 12 and fall on function plane 13 which contains the data function. The data function, which may be a function of $x$ only or both $x$ and $y$, is recorded on photographic film or other transparency such that the emergent light amplitude at a point $x_1, y_1$ is equal to $C+f(x_1, y_1)$, where C is a constant representing the average value of the amplitude of the emergent light and $f(x_1, y_1)$ is the data function to be analyzed.

Each point on the transparency function may be considered to be a Huygens source which radiates monochromatic rays whose amplitude is determined by the recorded function and the position of the point in question. These rays are brought to bear on integrating lens 14 which converges them, thereby producing the desired diffraction pattern on spectrum plane 15. It is this diffraction pattern that indicates the frequency components contained in the data function and the signal strength of each such frequency component. More specifically, since each point on the transparency function may be looked upon as a Huygens source, the amplitude of the light at any particular point in spectrum plane 15 can be found by adding the amplitudes and phases of all the light rays originating from all the points on the data function transparency and projected to the point on the spectrum plane. By so doing, it is found that a diffraction pattern is formed in the spectrum plane and that the intensity of the light at any point in the pattern is proportional to the amplitude of the power spectral-density of the data function for a particular frequency component, that is, there is a complete correspondence between points in the diffraction pattern on the spectrum plane and frequency components of the data function. In other words, each point in the diffraction pattern on the spectrum plane relates to a specific frequency component of the recorded data function so that if a particular frequency is not included in the data function being analyzed, then the associated point in the spectrum plane will not be illuminated. On the other hand, when a point on the spectrum plane is illuminated, the intensity of the light at that point is proportional to the amplitude of the power spectrum of the data function at the frequency to which the point corresponds.

Stated still differently, since every point on the emergent face of the function plane may be considered as a Huygens source, all light rays leaving in a direction given by the direction cosines $\alpha$ and $\beta$ are focused by the integrating lens at one particular point on the spectrum plane. If the light wavelength is $\lambda$, the light amplitude A at the point in the spectrum plane is:

$$A = \int_{x,y} f(x,y) \cos\left[\omega t - \frac{2\pi x}{\lambda}\alpha - \frac{2\pi y}{\lambda}\beta\right] dx\, dy \quad (1)$$

and the light intensity is:

$$I = \frac{1}{2}\left\{\int_{x,y} f(x,y) \cos \frac{2\pi}{\lambda}(x\alpha + y\beta)\, dx\, dy\right\}^2 + \frac{1}{2}\left\{\int_{x,y} f(x,y) \sin \frac{2\pi}{\lambda}(x\alpha + y\beta)\, dx\, dy\right\}^2 \quad (2)$$

Except for a factor of $\pi/2$, the integrals in Equation 2 are the two-dimensional Fourier coefficients of the function $f(x, y)$ and the intensity at the point of $\alpha, \beta$ in the spectrum plane is proportional to the amplitude of the two-dimensional wave-number power spectrum of $f(x, y)$ for the wave-numbers $$k_x = \frac{2\pi}{\lambda}\alpha, \quad k_y = \frac{2\pi\beta}{\lambda}$$

Thus, a monochromatic point source of light produces a diffraction pattern in the spectrum plane and each point in the pattern corresponds to a particular wave-number value. The intensity of the light gives the amplitude of the wave-number power spectrum of the function $f(x, y)$.

With respect to any critical distances that may be involved in the placement of the various component parts of the analyzer, it is only necessary that aperture source 11 be in the focal plane of collimating lens 12 and that spectrum plane 15 be in the focal plane of integrating lens 14. By so doing, the diffraction pattern will be obtained.

As was mentioned previously, either a plurality of photo-detector devices 18 or a single photo-detector device movable on a track for scanning purposes is positioned behind spectrum plane 17 for expeditiously recognizing the existence of specific frequency components and for identifying those components, in the first arrangement the photo-detector devices respectively being in registration with the points on the spectrum plane whereat light images may be expected to occur when the associated frequency components are included in the data function being analyzed. Whatever the arrangement, it was also mentioned that the photo-detector elements are connected to a meter or recorder mechanism (not shown). Thus, when a photo-detector tube is activated, thereby causing a registration on the meter or recorder mechanism, it means that there is energy in a particular frequency band of the data function spectrum. It will be recognized that the amplitude of the signal produced by a photo-detector element is proportional to the intensity of the light incident upon that photo-detector element. Accordingly, the amplitude of said electrical output signal is indicative of the power contained in the abovesaid frequency band of the data function being analyzed.

The different types of diffraction patterns that will be obtained through the use of differently shaped entrance apertures 11a are illustrated by way of example in FIG. 2. In FIG. 2a, there is shown a plurality of points or spots of light of different intensity arranged in a line, this form of diffraction pattern being obtained when a pinhole entrance aperture is utilized and the data function contains only discrete frequency components. In FIG. 2b, a plurality of lines are obtained instead and this corresponds to the use of a slit as the source aperture rather than a pinhole. In this case, the intensity distribution in the spectrum plane is spread over an area rather than a line. This display is still one-dimensional, however, since the intensity varies only along the $x$ direction. In the third example, namely, in FIG. 2c, the spectrum presentation obviously corresponds to the use of a tapered or triangular-shaped slit, by means of which frequency is presented along axis and bandwidth along one the other.

It should be noted that each of the patterns obtained is symmetrical about a central zero frequency line so that frequency components of a data function will be presented twice in the spectrum plane, once to the right of the zero frequency line and once to the left of it. Consequently, for sake of simplicity and practicality, it it may be advantageous in any embodiment of the invention to block off the pattern to one side of the zero frequency line. In the figure, the zero frequency line is indicated by the arrows shown therein. It should also be noted in connection with FIG. 2c that a frequency versus bandwidth presentation can also be obtained by cocking the spectrum plane at an angle so that the spectrum display is in focus near the bottom of the plane and becomes progressively more out of focus with distance up the plane.

A mechanization of the present invention is illustrated in FIG. 3 and, as shown, the equipment therein includes a box-like structure 20 in which is mounted a mechanism 21 for housing light source 10 and its accompanying filter which together constitute a monochromatic light source. Mechanism 21 includes openings or vents 22 along its sides to provide circulation of air for cooling purposes and, in addition, includes apertures on its top side of the type described, the apertures being aligned with the light source. Specifically, the openings comprise a pinhole source, a rectangular slit and a triangular slit and these may be selectively controlled for use by means of a rod 23 extending from the plate containing the aperture to a control device 24 mounted on the front face of structure 20. Also mounted on the front face of structure 20 is an ON-OFF switch 25, and a control mechanism 26 by means of which the amount of power fed to the light source is controlled. The electrical power needed for lamp illumination purposes is provided to apparatus 21 by means of a transformer 27 which is connected to apparatus 21 by means of a pair of wires.

Mounted on the top side of apparatus 21 and immediately above the plate containing the apertures is a lens mount or lens barrel 28 which firmly holds collimating lens 12 in position above the apertures and parallel to them. Mounted above lens barrel 28 is a cylindrical tube 30 having a right-angle bend in it so that one arm of the tube extends downwardly toward the lens barrel and is in registration therewith and the other arm of the tube extends horizontally toward the front panel or front face of structure 20. At the bend in tube 30 there is mounted a mirror 31 which preferably forms equal angles with the vertical and horizontal axes of the tube. Consequently, any rays of light applied in a vertical direction to mirror 31 will be reflected by the mirror in a horizontal direction. Integrating lens 14 is mounted in the open end of the vertical segment of tube 30, the axis of lens 14 being substantially coincident with the vertical axis of the tube. Similarly, magnifying lens 16 is mounted in the open end of the horizontal segment of tube 30, the axis of lens 16 being substantially coincident with the horizontal axis of the tube. Spectrum plane 17 is located on the front face of structure 20.

Interposed between lens barrel 28 and the vertical segment of cylindrical tube 30 is a thin frame member 32 slanted at an angle to the optic axis and having a rectangular window 33 that is coincident with the face of lens 12 and the open end of tube 30. The film transparency upon which the data function is recorded is passed over rectangular opening 33 so that member 32 may be said to constitute function plane 13 in FIG. 1. The film transparency is wound on a reel 34, the film being directed from the reel and over window 33 by means of a control slot generally designated 35. After analysis of the data function, the film is wound for storage on a take-up reel 36. Reels 34 and 36 are adapted to be mounted on structure 20 which, in turn, is adapted to receive these reels. Furthermore, reels 34 and 36 are firmly mounted on rotatable shafts 37 and 38 by means of which the reels may be operated, either manually or by means of a motor drive.

Looking to the top side of structure 20, it is seen that this structure is adapted to have a power meter device, generally designated 40, securely mounted thereon. It is the function of power meter 40 to selectively measure the power contained in a narrow frequency band of the data function being analyzed and for this purpose the meter includes a cantilevered reflecting mirror 41 which may be swept back and forth across and in front of spectrum plane 17, a photo-detector tube (shown in FIGS. 4 and 5), and a voltmeter type of device 42. As shown in FIG. 3, reflecting mirror 41 extends downwardly from power meter 40 and into the path of the light rays emerging from magnifying lens 16 for projection upon spectrum plane 17. Furthermore, the mirror is inclined at an angle with respect to the horizontal axis of tube 30. Accordingly, mirror 41 is in a position to selectively reflect to the photo-detector tube in power meter 40 any one of the components making up the diffraction pattern projected upon spectrum plane 17. More detailed information with respect to power meter 40 will be presented below. Suffice it to say for the present that reflecting mirror 41 may be swept back and forth across spectrum plane 17 either by manual control or by means of a motor 43 coupled to the meter. Also, power meter 40 is adapted so that a recorder mechanism 44 may be electrically coupled to it, the purpose of such a recorder mechanism being to visibly present the measurements made by meter 40 at any one time or over a period of time.

Finally, it will be noted by reference to FIG. 3 that a flange element 45 is mounted upon spectrum plane 17 in such a manner as to surround the diffraction pattern visibly produced thereon. The purpose of this flange element is to provide the support for a camera, generally designated 46, in the event that it may be desirable to mount a camera over the spectrum plane. The reason for mounting a camera 46 on flange element 45 to overlook spectrum plane 17 will become clearer later.

A side view of structure 20 and its internal apparatus as well as an exposed side view of power meter 40 mounted on structure 20 is illustrated in FIG. 4. The lamps constituting the light source, not shown before but clearly illustrated herein, are designated 21a. The aperture plate containing the different types of apertures through which the light from lamps 21 emerges was not previously designated and, therefore, is designated 47 herein. Similarly, in power meter 40, the photo detector tube is designated 48. Also in power meter 40, the means by which reflecting mirror 41 is held in position below the meter itself and moved back and forth is generally designated 50.

Figure 5:
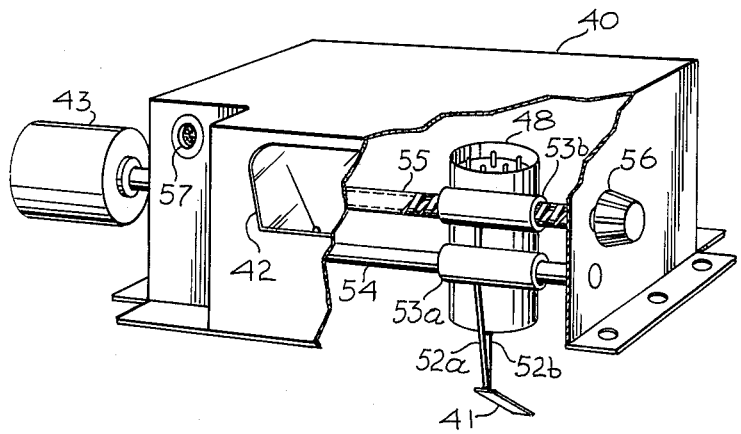
FIG. 5 is a more detailed showing of one of the elements in the system of FIGS. 3 and 4, namely, the spectral power meter device.

Power meter 40 is shown in enlarged detail in FIG. 5 and is partially in cross-section to expose its more significant internal members. Thus, it is seen that mirror 41 is supported by a pair of rods 52a and 52b by being rigidly fastened to one end of these rods, the other ends of rods 52a and 52b respectively being fastened to a pair of guide elements 53a and 53b. Guide element 53a is cylindrically shaped, internally smooth and slidably mounted on a rod 54. Guide element 53b, on the other hand, aside from also being cylindrically shaped, is internally threaded and is mounted on a lead screw 55.

Lead screw 55 is rotatable in nature and may be rotated by means of motor drive 43, as previously indicated, or manually with the aid of a knob 56. Rotation of lead screw 55 in one direction or the other causes guide element 53b and, therefore, guide element 53a, to move either to the left or the right taking mirror 41 along with them. It will be noted that photo-detector tube 48 is physically joined to either one or both of guide elements 53a and 53b and, consequently, moves along with mirror 41 so as to at all times catch the light reflected from the mirror. It will finally be noticed with respect to power meter 40 that a jack 57 is provided by means of which additional electrical equipment, such as recorder mechanism 44 in FIG. 3, may be connected to receive the electrical signals out of photo-detector tube 48.

Having considered the constructural features of one embodiment of the present invention, it is now desirable to consider the manner in which a data function is obtained on a photographic film transparency. The data function, it will be remembered, is a density-modulated film trace of constant width, where the density at any point along the photographic image is proportional to the square of the amplitude of the data function.

A technique for obtaining a data function is illustrated in FIGS. 6(a) and 6(b) and involves the use of tape recorder apparatus 60, suitable amplifying apparatus 61, an oscilloscope 62 and a camera 63 adapted to photograph images appearing on the oscilloscope screen. Tape recorder 60 may be a standard type of recorder capable both of recording the data and playing it back. Accordingly, recorder mechanism 60 and the manner in which is is used are well known and, therefore, no description in detail is deemed necessary. Suffice it to say, therefore, that the data function to be analyzed is recorded on the recorder tape in the form of an analog signal. Amplifier apparatus 61 may also be of the well-known type and is coupled to receive the analog signal from recorder 60. The output end of apparatus 61 is coupled to the cathode circuit of oscilloscope 62 so that the strength of the electron beam is made to vary in accordance with the amplitude of the analog signal. The film upon which the data function is recorded is contained in camera 63 and is drawn past the face of the oscilloscope. While the film may be moved at any one of a number of different speeds, it is desirable that it be moved at a speed of about 20 inches per second when the maximum frequency to be recorded is 10 kilocycles. The fidelity with which the data is recorded is in part determined by the speed accuracy with which the film moves past the oscilloscope face. In the standard continuous strip film camera, wherein the film is driven by sprockets engaging perforations in the film, speed accuracy is limited to about 0.5% due to the sprocket tooth design necessary to accommodate inaccuracies in film perforation spacing. Greater film speed accuracy can be achieved by driving the film between pressure rollers in a manner similar to that used in precision magnetic tape transport mechanisms. A camera employing this type of film transport could realize speed accuracies of about 0.1%.

To convert the analog signal in tape recorder 60 to the desired data function on the film transparency of camera 63, the tape is played back at the same speed at which the data was recorded, resulting in a real-time presentation of the data. The output from tape recorder 60 is amplified in amplified apparatus 61 and thereafter applied to the cathode of oscilloscope 62 for the reasons already mentioned. The oscilloscope itself is uniquely adjusted as will be explained below to provide a thin but sharp line on its screen of desired length so that, with the application of the analog signal to the cathode, the line is intensity modulated. Stated differently, a line of constant length but of varying light intensity will thusly appear on the face of the screen. Accordingly, as camera 63 moves its film past the face of the oscilloscope, the data function is recorded in the form of a density-modulated trace. An example of density modulation is presented in FIG. 6b which shows only oscilloscope 62 and the tape from camera 63. The density-modulated portion of the film transparency, that is, the data function, is designated 64.

The particular technique employed herein for producing a density-modulated data function on a film transparency involves a novel adjustment of the cathode ray tube in oscilloscope 62 and may be understood by referring to FIG. 7(a) wherein a cathode-ray tube is illustrated. More specifically, it has been found that if the focusing electrode is completely defocused and suitable negative voltages applied to the horizontal and vertical deflecting plates, the electron beam is nevertheless focused into a very fine line of high intensity and of desired length, as depicted in FIG. 7(b) wherein the face of the tube is shown. Still more specifically, with the focusing electrode completely defocused, it has been found that the horizontal and vertical deflecting plates act like a pair of cylindrical electron lenses, with the negative voltage applied to the vertical deflecting plates producing a horizontal line across the face of the tube and the negative voltage applied to the horizontal deflecting plates determining the length of this line, the length of the line being directly proportional to the voltage applied. As compared to the usual oscilloscope trace, the line thusly produced is a very fine line due to the spreading of the electron beam; yet is much more intense because the electrons are always hitting at the same spot.

If now, a variable signal is applied to the cathode, the line on the face of the tube will be intensity modulated as heretofore mentioned. By passing the film across the face of the oscilloscope in a direction that is transverse to the line, the data function is recorded in the form of a density-modulated trace. Also, to avoid injecting any 60 cycle modulation, the cathode is preferably heated by means of direct current rather than by alternating current as is normally done.

Having acquired an understanding of the manner in which the data function is produced on the film transparency and an understanding of the appearance or the photographic image of the data function, reference is now made once again to FIGS. 3, 4 and 5, particularly FIG. 3, for an explanation of the operation of the embodiment being described herein. More particularly, assuming that a section of film transparency upon which a data function has been recorded overlies window 33 in member 32, the monochromatic light passing through one of the entrance apertures in aperture plate 47 is applied to collimating lens 12 and from thence to the film transparency. The rays of light emerging from the film transparency are then passed through integrating lens 14 to mirror 31 from which the rays of light are reflected to magnifying lens 16. Following lens 16, the rays of light are projected upon spectrum plane 17. In accordance with the principles previously described in connection with FIG. 1, it will be recognized that the rays of light projected upon the spectrum plane will form a diffraction pattern in which each component corresponds to a frequency component in the original data signal and in which the light intensity of each component constitutes a measure of the power contained in the above-said frequency component. A reading of the power contained in any spectrum component may be obtained with the aid of power meter 40. Specifically, small rectangular mirror 41 is positioned in the light path in such a manner as to reflect the light beam of a particular diffraction pattern component on to the opening of photo tube 48. The lead screw and guide mechanism move the photo tube and mirror together in order to direct the narrow bandwidth of light on to the photo tube. The remaining components of light are projected on to the viewing screen, the narrow mirror shadow on the screen representing the frequency the photo tube is observing. The output of the photo tube is fed into voltmeter 42 so that readings on the voltmeter represent the spectrum energy in a narrow bandwidth as indicated by the mirror shadow in the frequency spectrum. The voltmeter, of course, achieves accuracies of a much higher level than can be observed by the eye.

Since analysis occurs instantaneously, the data function can be fed continuously through the analyzer for the purpose of examining the change in the spectrum with time. Thus, for example, assuming that the diffraction pattern shown in FIG. 2a is projected upon viewing screen 17, the manner in which the components of the diffraction pattern vary with the passage of time may be observed and, in fact, permanently recorded by doing two things; first, by advancing the film transparency at a predetermined rate and second, by mounting camera 46 upon flange 45 and advancing the film therein at a corresponding rate. Of course, if a permanent record is not required, the changing diffraction pattern may be viewed or observed with the naked eye.

Apertures or stops may be introduced in the spectrum plane to achieve bandpass or band rejection filtering. The transmissivity of a stop can be varied to attenuate the frequency band to a greater or lesser extent. Phase plates may also be used in the spectrum plane to shift the phase of any desired frequency or band of frequencies. Additional lenses can then be used to invert back to a presentation of the original data function with certain frequency components removed, attenuated or shifted in phase. An arrangement for filtering out or removing certain frequency components is schematically presented in FIG. 8. As shown therein, a rod-like member 65 is positioned immediately above spectrum plane 15 and has a pair of stops or shields 66a and 66b hanging from it, the shields being positioned in such a manner as to prevent pre-selected components of the diffraction pattern from passing through the spectrum plane screen. Interposed between spectrum plane 15 and a second data function plane 67 is an inverter lens 68, the components of light allowed to pass through the spectrum plane to inverter lens 68 being synthesized by this lens and projected upon plane 67 in the form of the original data function minus the frequency components removed. In this way, the effect of particular frequency components may be observed.

Considering the matter of filters still further, an optical matched filter constituting another embodiment of the present invention is shown in FIG. 9. As in FIG. 8, this embodiment basically includes a monochromatic light source 10, a source aperture 11, a collimating lens 12, a data function transparency 13, an integrating lens 14, an inverter lens 68 and a spectrum plane 67. It also includes a new element, namely, a transparency 70 upon which has been photographically recorded the diffraction pattern for another data function, such as, for example, a function associated with a particular sequence of pulses. Transparency 70 is interposed between lines 14 and 68.

More specifically, each pulse in a time-spaced sequence or group of pulses representing particular information is applied in turn to the cathode of the cathode-ray tube in oscilloscope 62 in FIGS. 6 and 7. As a result, in accordance with the density-modulation technique previously delineated, a density-modulated trace corresponding to the pulse sequence is recorded on a strip of photographic film. This strip of film is then placed in function plane 13 in the analyzer of FIG. 8 to provide a diffraction pattern that also corresponds to the particular pulse sequence. This pattern is then recorded on a strip of film transparency and it is this latter transparency that constitutes element 70 in FIG. 9, the pattern being transparent while the rest of the film is opaque.

If, now, a length of film transparency upon which a density-modulated trace is recorded corresponding to a large number of pulse groups is placed in data function plane 13 in FIG. 9 and the film thereafter advanced at a constant rate, for the reasons previously set forth a continually changing or varying diffraction pattern will be projected upon or, stated differently, superimposed upon, the fixed diffraction pattern on transparency 70. Consequently, varying amounts of light will pass through transparency 70, the maximum amount of light being permitted to pass through when the two diffraction patterns involved are identical. The occurrence of maximum light passage corresponds to the situation in which the portion of the data function being analyzed represents exactly the same pulse sequence as that used to produce the diffraction pattern ultimately recorded on film element 70. For all other pulse sequences, represented by data function 13, the two diffraction patterns involved are dissimilar to a lesser or greater extent and hence, as previously stated, at all other times the total amount of light passed through element 70, while varying, is less than the maximum. It will thus be apparent from what has been said that the embodiment of FIG. 9 is basically an optical matched filter and is capable of identifying or distinguishing one signal arrangement out of many.

Following film element 70, the light emergent therefrom is projected upon inverter lens 68 which synthesizes the separate bands or streams of light to produce a single bar or circle of light whose intensity varies in accordance with the amount of light incident upon the inverter lens. This output light is projected upon output plane 67 in FIG. 9, and is designated 71. Thus, the output bar or circle of light expedites and facilitates the identification of an unknown signal since it may be used in conjunction with a photocell device and a "greatest-of" detector, the latter being a circuit which will identify the signal of greatest amplitude produced by the photocell. Neither the photocell nor the detector are shown.

It would be worthwhile to note at this point that pulsed lighting may also be used to advantage as, for example, where brighter or more intense lighting is required. This may be accomplished by turning the lamp ON and OFF or, better still, by using a shutter device in front of the lamps. It is also deemed important to mention that instead of using a transparency, the data function could be recorded on an opaque element from which the light could be reflected. In other words, reflection recording rather than transmittance recording can be used, the amplitude of the light reflected at any point $x_1$, $y_1$ being proportional to $f(x_1, y_1)$. Alternatively, for one-dimensional functions, the width of the reflection data track is proportional to the amplitude of the function. The data record is placed at an angle to the direction of the incident light and the integrating lens is placed in a position to receive the reflected light.

Having thus described the invention, what is claimed as new is:

1. An optical analyzer comprising in optical alignment:
   a source of monochromatic light;
   a light barrier for said source having a plurality of apertures therein, including at least one aperture of varying width and a second aperture of fixed width;
   a lens for collimating the light passing through the barrier from said source;
   means for supporting a density modulated pattern of complex data containing a frequency distribution for illumination by the collimated monochromatic light from the source passing through one of the apertures;
   an integrating lens positioned to converge the light passing through the data pattern into a spectrum plane wherein the frequency distribution of the complex wave pattern is displayed; and,
   means for scanning the spectrum display to provide an electrical signal which is representative of the frequency distribution of said complex data pattern.

2. The combination in accordance with claim 1 wherein said supporting means positions the pattern of complex data at an angle with respect to the direction of travel of light rays through the pattern whereby the spectrum display produced is in varying degrees of focus at the spectrum plane, whereby a band-width-frequency distribution may be displayed.

3. The combination in accordance with claim 2 wherein said barrier means is movable to first and second positions whereby the light illuminating the data pattern passes through the fixed width aperture to produce a fixed band width presentation and through the varying width aperture to produce a band width frequency analysis presentation of the complex data pattern.

References Cited by the Examiner

UNITED STATES PATENTS

| | | | |
|---|---|---|---|
| 2,514,595 | 7/1950 | Austin | 88—24 |
| 2,777,354 | 1/1957 | Stickney et al. | 88—14 |
| 2,932,549 | 4/1960 | Kling et al. | 346—110 |
| 2,965,434 | 12/1960 | Downs | 346—110 |
| 3,011,386 | 12/1961 | Rosenthal | 88—14 |
| 3,012,467 | 12/1961 | Rosenthal | 88—14 |
| 3,064,519 | 11/1962 | Shelton | 88—1 |
| 3,118,129 | 1/1964 | Fitzmaurice | 88—1 |

OTHER REFERENCES

Arman et al.: "Optical Autocorrelation Measurement of Two-Dimensional Random Patterns," Review of Scientific Instruments, vol. 28, No. 10, Oct. 1957, pages 793–797.

Born et al.: "Principles of Optics," Pergamon Press, New York, 1959, pages 457 and 511.

Howell: "Optical Analog Computers," Journal of the Optical Society of America, vol. 49, No. 10, Oct. 1959, pages 1012–1021, page 1019 relied upon.

Macbeth—Brochure advertising the Macbeth Quanta-Log EP–1000 Photographic Color Analyzer Densitometer. Designated as Bulletin 299, received in Div. 7, Feb. 5, 1960.

JEWELL H. PEDERSEN, *Primary Examiner.*

WILLIAM MISIEK, EMIL G. ANDERSON, *Examiners.*